United States Patent
Alperovich et al.

(10) Patent No.: US 10,733,191 B2
(45) Date of Patent: Aug. 4, 2020

(54) STATIC STREAMING JOB STARTUP SEQUENCE

(71) Applicant: Microsoft Technology Licensing, LLC, Redmond, WA (US)

(72) Inventors: Alexander Alperovich, Redmond, WA (US); Boris Shulman, Sammamish, WA (US); Todd Robert Porter, Seattle, WA (US); Patrick Chung, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/145,337

(22) Filed: Sep. 28, 2018

(65) Prior Publication Data

US 2020/0104399 A1  Apr. 2, 2020

(51) Int. Cl.
*G06F 16/2455* (2019.01)
*H04L 29/06* (2006.01)
(Continued)

(52) U.S. Cl.
CPC .... *G06F 16/24568* (2019.01); *G06F 16/9024* (2019.01); *H04L 1/0027* (2013.01);
(Continued)

(58) Field of Classification Search
CPC ........... G06F 16/24568; G06F 16/9024; H04L 65/4069; H04L 1/0027; H04L 12/4015;
(Continued)

(56) References Cited

U.S. PATENT DOCUMENTS 6,356,902 B1 * 3/2002 Tan .................... G06F 16/40
8,219,574 B2 * 7/2012 Liu .................. G06F 16/24568
707/759

(Continued)

FOREIGN PATENT DOCUMENTS

WO    2017123849 A1    7/2017

OTHER PUBLICATIONS

Chen, Zhong, "Spark Streaming and Azure Stream Analytics", retrieved from "https://blogs.msdn.microsoft.com/streamanalytics/2016/06/16/spark-streaming-and-azure-stream-analytics/" on Sep. 27, 2018, Jun. 16, 2016, 6 pages.

(Continued)

*Primary Examiner* — Michael Won
(74) *Attorney, Agent, or Firm* — Rainier Patents, P.S.

(57) ABSTRACT

Described herein is a system and method for a static streaming job startup sequence. During compilation of a streaming job, a graph of computing nodes of the streaming job is traversed to determine a minimum start time of computing node(s) downstream of each input computing node of the streaming job. Also, during compilation, a start time is assigned to each input computing node in accordance with the determined minimum start time. During execution of the streaming job, responsive to receipt of the trigger anchor by a particular input node, processing of the particular input computing node using the determined minimum start time is commenced. The input computing node further generates an anchor. Input data is received, and, a batch of data provided in accordance with the received input data and generated anchor.

20 Claims, 4 Drawing Sheets

(51) Int. Cl.
*G06F 16/901* (2019.01)
*H04L 1/00* (2006.01)
*H04L 12/801* (2013.01)
*H04L 12/40* (2006.01)
*H04L 29/08* (2006.01)

(52) U.S. Cl.
CPC .......... *H04L 12/4015* (2013.01); *H04L 47/19* (2013.01); *H04L 65/4069* (2013.01); *H04L 65/80* (2013.01); *H04L 67/1095* (2013.01)

(58) Field of Classification Search
CPC ............. H04L 2012/5679; H04L 47/19; H04L 65/1069; H04L 65/80; H04L 67/1095; H04N 21/2389; H04N 21/4385
USPC ....... 709/231, 220, 226, 228, 235, 237, 242, 709/244, 250
See application file for complete search history.

(56) References Cited

U.S. PATENT DOCUMENTS

| | | | | |
|---|---|---|---|---|
| 8,713,195 | B2* | 4/2014 | Pickens | H04L 1/004 709/231 |
| 2004/0221054 | A1* | 11/2004 | Bhattacharya | H04N 21/4402 709/231 |
| 2009/0002016 | A1* | 1/2009 | Hutchings | H03K 19/17736 326/16 |
| 2010/0106853 | A1* | 4/2010 | Kashiyama | G06Q 10/06 709/231 |
| 2010/0106946 | A1* | 4/2010 | Imaki | G06F 16/24542 712/220 |
| 2010/0293532 | A1* | 11/2010 | Andrade | G06F 11/1438 717/140 |
| 2011/0307897 | A1* | 12/2011 | Atterbury | G06F 9/44521 718/102 |
| 2013/0166618 | A1* | 6/2013 | Branson | G06F 9/30 709/201 |
| 2013/0254771 | A1* | 9/2013 | Musayev | G06F 9/4843 718/101 |
| 2015/0081923 | A1* | 3/2015 | Hironaka | H04L 65/604 709/231 |
| 2015/0149507 | A1* | 5/2015 | Imaki | G06F 16/24568 707/798 |
| 2016/0203188 | A1* | 7/2016 | O'Connor | G06F 11/3476 707/756 |
| 2016/0359940 | A1* | 12/2016 | Chen | H04L 65/4069 |
| 2017/0097973 | A1* | 4/2017 | Iannaccone | H04L 67/1095 |
| 2017/0337067 | A1* | 11/2017 | Cradick | G06F 11/30 |
| 2018/0262408 | A1* | 9/2018 | Alperovich | H04L 69/40 |

OTHER PUBLICATIONS

U.S. Appl. No. 15/977,916, filed May 11, 2018, Specification and Drawings, 41 pages.

"International Search Report and Written Opinion Issued in PCT Application No. PCT/US19/039100", dated: Oct. 9, 2019, 13 pages. (MS#405066-WO-PCT).

Qian, et al., "TimeStream: Reliable Stream Computation in the Cloud", In Proceedings of the 8th ACM European Conference on Computer Systems, Apr. 15, 2013, pp. 1-14.

Svingos, et al., "Real Time Processing of Streaming and Static Information", In Proceeding of IEEE International Conference on Big Data (Big Data), Dec. 5, 2016, pp. 410-415.

* cited by examiner

STATIC STREAMING JOB STARTUP SEQUENCE

BACKGROUND

Stream processing allows multiple data streams from multiple sources to be processed in real-time. "Streaming" or stream processing refers to receiving streams of data, processing the data by multiple processors and streaming the processed data back out as a single flow.

SUMMARY

Described herein is a system for a static streaming job startup sequence, comprising: a processing system comprising a processor and a memory having computer-executable instructions stored thereupon which, when executed by the processor, cause the processing system to: during compilation of a streaming job: traverse a graph of computing nodes of the streaming job to determine a minimum start time of one or more computing nodes downstream of each of one or more input computing nodes of the streaming job; and assign a start time to each of the one or more input computing nodes in accordance with the determined minimum start time, wherein processing of a particular input computing node using the determined minimum start time is commenced upon receipt of a trigger anchor. During execution of the streaming job: responsive to receipt of the trigger anchor by a particular input node: generate an anchor; receive input data; and, provide a batch of data in accordance with the received input data and generated anchor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Various technologies pertaining to a static streaming job startup sequence are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding a static streaming job startup sequence. What follows are one or more exemplary systems and methods.

Aspects of the subject disclosure pertain to the technical problem of startup of a streaming job. The technical features associated with addressing this problem involve during compilation of a streaming job: traverse a graph of computing nodes of the streaming job to determine a minimum start time of one or more computing nodes downstream of each of one or more input computing nodes of the streaming job; and, assign a start time to each of the one or more input computing nodes in accordance with the determined minimum start time, wherein processing of a particular input computing node using the determined minimum start time is commenced upon receipt of a trigger anchor. During execution of the streaming job: responsive to receipt of the trigger anchor by a particular input node: generate an anchor; receive input data; and, provide a batch of data in accordance with the received input data and generated anchor. Accordingly, aspects of these technical features exhibit technical effects of more efficiently and effectively fabricating three-dimensional objects, for example, reducing consumption of network bandwidth and/or computing node processing resource(s).

Moreover, the term "or" is intended to mean an inclusive "or" rather than an exclusive "or" That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

In some embodiments, the technologies disclosed herein are used in conjunction with pull-based stream processing utilizing anchors that facilitates once and only once processing by output node(s). An "anchor" is generated by an input node (e.g., along with an output stream) and describes a point in the output stream of the input node, so that other unit(s) of data in the output stream are either before or after any given anchor.

In some embodiments, non-input nodes (e.g., intermediate computing nodes and output nodes) do not need to understand anchors or how the anchors were generated by input nodes. The non-input nodes are responsible for being able to determine comparability of anchors. That is, whether a particular anchor indicates an event or point in the output stream occurring before another anchor, whether the particular anchor is equal to another anchor, or whether the particular anchor indicates an event or point in the output stream occurring after another anchor.

During normal operation, down-stream nodes receive an anchor along with a batch of data. The anchor, generated by the input node that generated the batch of data, is a pointer in the output stream reflecting the last portion of data included in the batch of data. Once a downstream node (e.g., output node) has received and processed the batch of data, the down-stream node can request another batch of data beginning with the anchor of batch of data last received/processed (e.g., indicative of the downstream node having processed data up to the anchor).

Described herein are system and method for static streaming job startup sequence. During compilation of a streaming job, a graph of computing nodes assigned to the streaming job is traversed (e.g., from each input node downstream to output node(s)) to determine a minimum start time of computing nodes downstream (e.g., intermediate computing node(s) and/or output node(s)) of each of one or more input nodes of the streaming job. A start time is assigned for each of the one or more input nodes in accordance with the determined minimum start time. Processing of the particular input node using the determined minimum start time is commenced upon receipt of a trigger anchor (e.g., provided by a downstream node).

During execution of the streaming job, responsive to receiving the trigger anchor by the input node, the input node generates an anchor, and, receives input data. The input node then provides a batch in accordance with the received input data and generated anchor. The batch is provided to one or more computing node(s) (e.g., intermediate computing node(s) and/or output node(s)).

Figure 1:
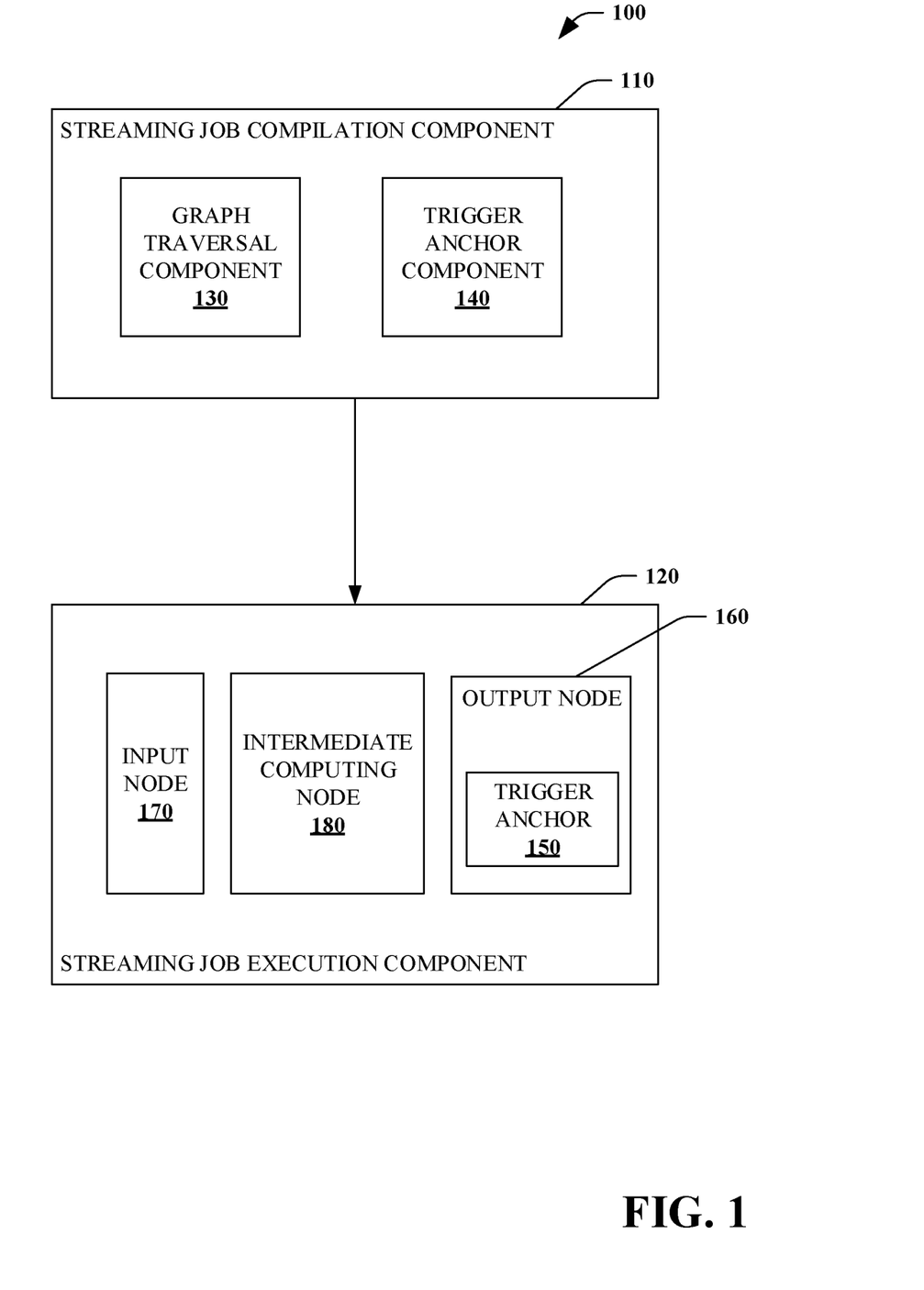
FIG. 1 is a functional block diagram that illustrates a system for a static streaming job startup sequence.

Referring to FIG. 1, a system for a static streaming job startup sequence 100 is illustrated. The system 100 includes a streaming job compilation component 110 and a streaming job execution component 120. In some embodiments, the system 100 can be utilized as an optimization or improvement to startup of a streaming job employing pull-based stream processing utilizing anchors.

The system 100 leverages knowledge (1) of the topology of computing nodes for a particular streaming job before execution of the job begins; and (2) that the job is starting up (as opposed to individual node(s) being in a recovery phase) in order to allow each input node to generate an initial anchor without waiting for cascading anchor requests (e.g., start anchor request) to be provided, for example, through various level(s) of intermediate computing node(s).

Figure 2:
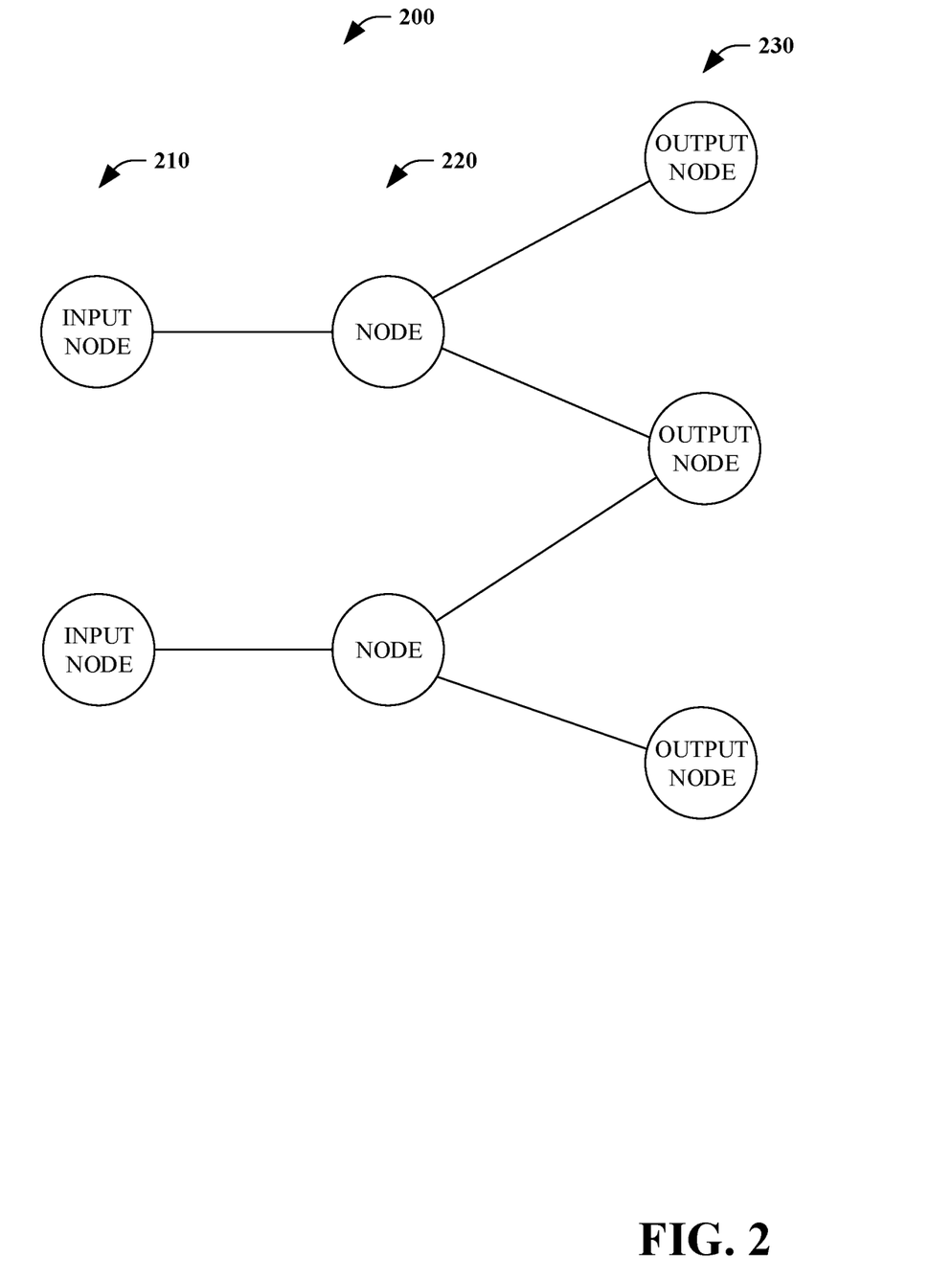
FIG. 2 is an exemplary graph of a streaming job.

Referring briefly to FIG. 2, an exemplary graph of a streaming job 200 is illustrated. For purposes of explanation and not limitation, the graph 200 is depicted with two input nodes 210, two intermediate computing nodes 220, and three output node 230. In some embodiments, streaming jobs include at least one input node 210 and at least one output node. In some embodiments, streaming jobs can include zero, one or a plurality of intermediate computing nodes 220. In some embodiments, a particular output node 230 can be connected, either directly or indirectly, to one or more input nodes 210.

The graph 200 represents data flow downstream from an input node 210 to output nodes 230. The graph 200 further represents requests for data (e.g., batches of data based upon anchors) from output nodes 230 upstream to the input node 210.

Referring back to FIG. 1, during a compilation phase, a graph traversal component 130 of the streaming job compilation component 110 traverses a graph of computing nodes assigned to the streaming job. In some embodiments, the graph can be traversed from each input node downstream to output node(s)) to determine a minimum start time of computing nodes downstream (e.g., intermediate computing node(s) and/or output node(s)) of each of input nodes of the streaming job. In some embodiments, the determined minimum start time can be modified in accordance with processing needs of intermediate computing node(s) (e.g., time window associated with processing performed by the intermediate computing node(s)).

In some embodiments, traversal is performed using a depth first search technique. In some embodiments, traversal is performed using a breadth first search technique.

Once the minimum start time (e.g., earliest point in time that of any output node directly or indirectly connected to the input node modified by time window(s) of intermediate computing node(s), if any), a start time is assigned for each of the input node(s) in accordance with the determined minimum start time. In some embodiments, the assigned start time(s) can be provided to the input node(s) by the streaming job compilation component 110 during the compilation phase. In some embodiments, the assigned start time(s) can be provided as part of a trigger anchor 150 received during an execution phase of the streaming job.

The streaming job compilation component 110 further includes a trigger anchor component 140 that provides the trigger anchor 150 to an output node 160 having the determined minimum start time for a particular input node 170. In some embodiments, the trigger anchor 150 is a special anchor which, during the execution phase, causes the input node 170 to begin processing and to generate an initial anchor. In some embodiments, the trigger anchor 150 is a special anchor that includes the determined minimum start time for the particular input node 170.

During the execution phase of the streaming job execution component 120 comprises one or more output node(s) 160 and one or more input node(s) 170. The output node 160 can cause the trigger anchor 150 to be provided upstream to the input node 170, for example, directly or indirectly through one or more intermediate computing node(s) 180. In some embodiments, upon receipt of the trigger anchor 150, an intermediate computing node 180 passes the trigger anchor 150 upstream without waiting for any additional downstream request(s) (e.g., without accumulating additional start anchor request(s)).

Upon receipt of the trigger anchor 150, the input node 170 commences processing using the determined minimum start time (e.g., pre-assigned during the compilation phase or derivable from the trigger anchor 150). During execution of the streaming job, responsive to receiving the trigger anchor 150 by the input node 170, the input node 170 generates an anchor, and, receives input data. The input node 170 can then provide a batch in accordance with the received input data and generated anchor. The batch is provided to one or more computing node(s) (e.g., intermediate computing node(s) and/or output node(s) 150). The use of trigger anchor(s) during startup of streaming job(s) can significantly reduce consumption of computing resource(s) and/or time.

Figure 3:
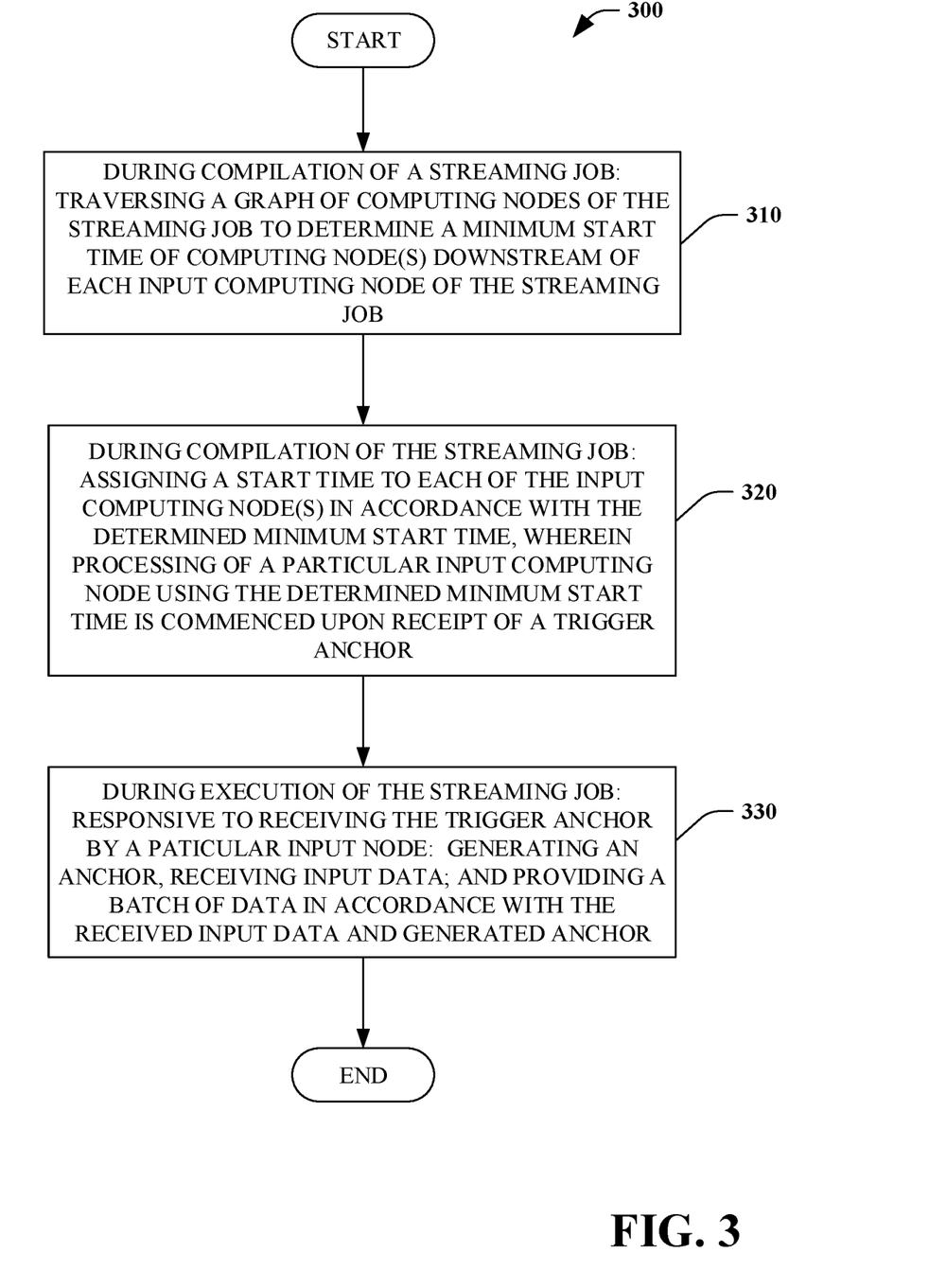
FIG. 3 is a flow chart of a method of a static streaming job startup sequence.

FIG. 3 illustrates an exemplary methodology relating to a static streaming job startup sequence. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 3, a method of a static streaming job startup sequence 300 is illustrated. In some embodiments, the method 300 is performed by the system 100.

At 310, during compilation of a streaming job, a graph of computing nodes is traversed to determine a minimum start time of computing node(s) downstream of each input computing node of the streaming job. At 320, during compilation of the streaming job, s tart time is assigned to each of the input computing node(s) in accordance with the determined minimum start time. Processing of a particular input computing node using the determined minimum start time is commenced upon receipt of a trigger anchor.

At 330, during execution of the streaming job, response to receipt of the trigger anchor by the input node, an anchor is generated. Input data is also received. Finally, a batch of data is provided in accordance with the received input data and generated anchor.

Described herein is a system for a static streaming job startup sequence, comprising: a processing system comprising a processor and a memory having computer-executable instructions stored thereupon which, when executed by the processor, cause the processing system to: during compilation of a streaming job: traverse a graph of computing nodes of the streaming job to determine a minimum start time of one or more computing nodes downstream of each of one or more input computing nodes of the streaming job; and assign a start time to each of the one or more input computing nodes in accordance with the determined minimum start time, wherein processing of a particular input computing node using the determined minimum start time is commenced upon receipt of a trigger anchor; during execution of the streaming job: responsive to receipt of the trigger anchor by a particular input node: generate an anchor; receive input data; and, provide a batch of data in accordance with the received input data and generated anchor.

The system can further include wherein the determined minimum time is modified in accordance with a time window associated with processing to be performed by an intermediate computing node. The system can further include wherein the anchor describes a point in an output stream. The system can further include wherein during execution of the streaming job, a particular a non-input node is configured to determine whether another anchor described a point in an output stream before, after, or equal to a particular anchor.

The system can further include wherein traversal is performed using a depth first search technique. The system can further include wherein traversal is performed using a breadth first search technique. The system can further include wherein the trigger anchor includes the assigned start time for the input node.

The system can further include wherein during execution of the streaming job, an intermediate computing node provides the trigger anchor to an upstream node without waiting for an additional downstream request.

Described herein is a method of static streaming job startup sequence, comprising: during compilation of a streaming job: traversing a graph of computing nodes of the streaming job to determine a minimum start time of one or more computing nodes downstream of each of one or more input computing nodes of the streaming job; and assigning a start time to each of the one or more input computing nodes in accordance with the determined minimum start time, wherein processing of a particular input computing node using the determined minimum start time is commenced upon receipt of a trigger anchor; during execution of the streaming job: responsive to receipt of the trigger anchor by a particular input node: generating an anchor; receiving input data; and, providing a batch of data in accordance with the received input data and generated anchor.

The method can further include wherein the determined minimum time is modified in accordance with a time window associated with processing to be performed by an intermediate computing node. The method can further include wherein the anchor describes a point in an output stream. The method can further include wherein during execution of the streaming job, a particular a non-input node is configured to determine whether another anchor described a point in an output stream before, after, or equal to a particular anchor.

The method can further include wherein traversal is performed using a depth first search technique. The method can further include wherein traversal is performed using a breadth first search technique. The method can further include wherein the trigger anchor includes the assigned start time for the input node.

The method can further include wherein during execution of the streaming job, an intermediate computing node provides the trigger anchor to an upstream node without waiting for an additional downstream request.

Described herein is a computer storage media storing computer-readable instructions that when executed cause a computing device to: during compilation of a streaming job: traverse a graph of computing nodes of the streaming job to determine a minimum start time of one or more computing nodes downstream of each of one or more input computing nodes of the streaming job; and assign a start time to each of the one or more input computing nodes in accordance with the determined minimum start time, wherein processing of a particular input computing node using the determined minimum start time is commenced upon receipt of a trigger anchor; during execution of the streaming job: responsive to receipt of the trigger anchor by a particular input node: generate an anchor; receive input data; and, provide a batch of data in accordance with the received input data and generated anchor.

The computer storage media can further include wherein the determined minimum time is modified in accordance with a time window associated with processing to be performed by an intermediate computing node. The computer storage media can further include wherein traversal is performed using a depth first search technique. The computer storage media can further include wherein traversal is performed using a breadth first search technique.

Figure 4:
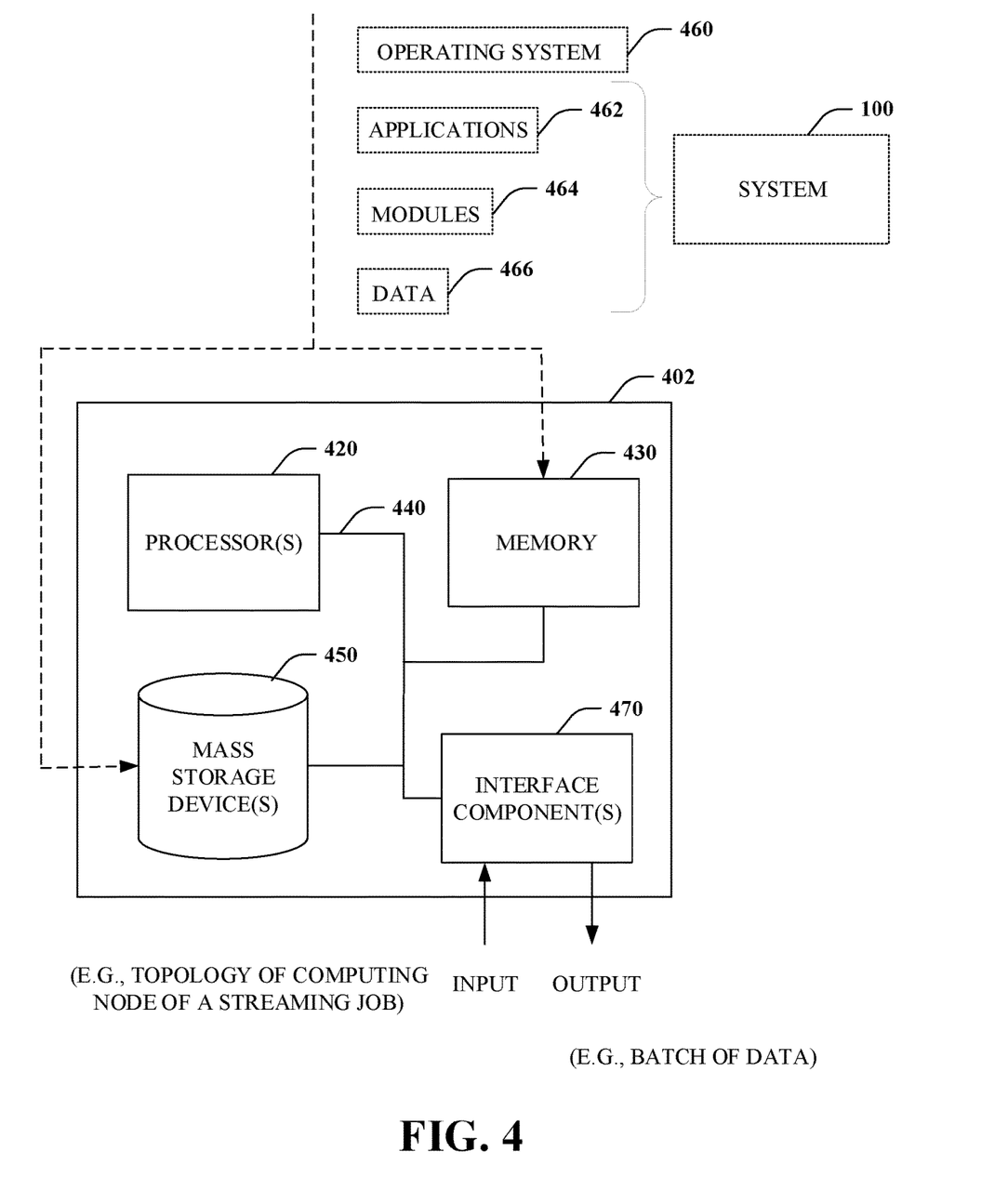
FIG. 4 is a functional block diagram that illustrates an exemplary computing system.

With reference to FIG. 4, illustrated is an example general-purpose processing system, computer or computing device 402 (e.g., mobile phone, desktop, laptop, tablet, watch, server, hand-held, programmable consumer or industrial electronics, set-top box, game system, compute node, etc.). For instance, the computing device 402 may be used in a system for a static streaming job startup sequence 100.

The computer 402 includes one or more processor(s) 420, memory 430, system bus 440, mass storage device(s) 450, and one or more interface components 470. The system bus 440 communicatively couples at least the above system constituents. However, it is to be appreciated that in its simplest form the computer 402 can include one or more processors 420 coupled to memory 430 that execute various computer executable actions, instructions, and or components stored in memory 430. The instructions may be, for instance, instructions for implementing functionality described as being carried out by one or more components discussed above or instructions for implementing one or more of the methods described above.

The processor(s) 420 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 420 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 420 can be a graphics processor.

The computer 402 can include or otherwise interact with a variety of computer-readable media to facilitate control of the computer 402 to implement one or more aspects of the claimed subject matter. The computer-readable media can be any available media that can be accessed by the computer 402 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 402. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 430 and mass storage device(s) 450 are examples of computer-readable storage media. Depending on the exact configuration and type of computing device, memory 430 may be volatile (e.g., RAM), non-volatile (e.g., ROM, flash memory, etc.) or some combination of the two. By way of example, the basic input/output system (BIOS), including basic routines to transfer information between elements within the computer 402, such as during start-up, can be stored in nonvolatile memory, while volatile memory can act as external cache memory to facilitate processing by the processor(s) 420, among other things.

Mass storage device(s) 450 includes removable/non-removable, volatile/non-volatile computer storage media for storage of large amounts of data relative to the memory 430. For example, mass storage device(s) 450 includes, but is not limited to, one or more devices such as a magnetic or optical disk drive, floppy disk drive, flash memory, solid-state drive, or memory stick.

Memory 430 and mass storage device(s) 450 can include, or have stored therein, operating system 460, one or more applications 462, one or more program modules 464, and data 466. The operating system 460 acts to control and allocate resources of the computer 402. Applications 462 include one or both of system and application software and can exploit management of resources by the operating system 460 through program modules 464 and data 466 stored in memory 430 and/or mass storage device (s) 450 to perform one or more actions. Accordingly, applications 462 can turn a general-purpose computer 402 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 462, and include one or more modules 464 and data 466 stored in memory and/or mass storage device(s) 450 whose functionality can be realized when executed by one or more processor(s) 420.

In accordance with one particular embodiment, the processor(s) 420 can correspond to a system on a chip (SOC) or like architecture including, or in other words integrating, both hardware and software on a single integrated circuit substrate. Here, the processor(s) 420 can include one or more processors as well as memory at least similar to processor(s) 420 and memory 430, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 402 also includes one or more interface components 470 that are communicatively coupled to the system bus 440 and facilitate interaction with the computer 402. By way of example, the interface component 470 can be a port (e.g., serial, parallel, PCMCIA, USB, FireWire, etc.) or an interface card (e.g., sound, video, etc.) or the like. In one example implementation, the interface component 470 can be embodied as a user input/output interface to enable a user to enter commands and information into the computer 402, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 470 can be embodied as an output peripheral interface to supply output to displays (e.g., LCD, LED, plasma, etc.), speakers, printers, and/or other computers, among other things. Still further yet, the interface component 470 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system comprising:
   a processing system comprising a processor and a memory having computer-executable instructions stored thereupon which, when executed by the processor, cause the processing system to:
   during compilation of a streaming job:
     obtain a graph of computing nodes of the streaming job, the graph comprising one or more input computing nodes and one or more downstream computing nodes that are downstream of the one or more input computing nodes;
     traverse the graph of computing nodes of the streaming job to determine one or more minimum start times of the one or more downstream computing nodes; and
     assign one or more input start times to the one or more input computing nodes in accordance with the one or more minimum start times of the one or more downstream computing nodes; and
   during execution of the streaming job:
     receive, at a particular input computing node, a trigger anchor from a particular downstream computing node;
     responsive to receipt of the trigger anchor by the particular input computing node, commence processing using a particular input start time assigned to the particular input computing node, the processing comprising:
       generating an initial anchor;
       receiving input data; and,
       providing a batch of data in accordance with the received input data and the initial anchor.

2. The system of claim 1, the memory having further computer-executable instructions stored thereupon which, when executed by the processor, cause the processing system to:
   modify a particular minimum start time is in accordance with a particular time window associated with processing to be performed by a particular intermediate computing node.

3. The system of claim 1, wherein the initial anchor describes a point in an output stream.

4. The system of claim 1, wherein, during execution of the streaming job, a particular non-input computing node is configured to determine whether another anchor describes a point in an output stream that is before, after, or equal to a particular anchor.

5. The system of claim 1, wherein traversal is performed using a depth first search technique.

6. The system of claim 1, wherein traversal is performed using a breadth first search technique.

7. The system of claim 1, wherein the trigger anchor includes the particular input start time for the particular input computing node.

8. The system of claim 1, wherein the particular downstream computing node provides the trigger anchor to the particular input computing node without waiting for an additional downstream request.

9. A computer-implemented method, comprising:
   during compilation of a streaming job:
     obtaining a graph of computing nodes of the streaming job, the graph comprising one or more input computing nodes and one or more downstream computing nodes that are downstream of the one or more input computing nodes;
     traversing the graph of computing nodes of the streaming job to determine one or more minimum start times of the one or more downstream computing nodes; and
     assigning one or more input start times to the one or more input computing nodes in accordance with the one or more minimum start times of the one or more downstream computing nodes,
   wherein receipt of a trigger anchor by a particular input computing node triggers the particular input computing node to commence processing the streaming job using a particular input start time assigned to the particular input computing node, the processing including generating an initial anchor and providing a batch of received input data in accordance with the initial anchor.

10. The computer-implemented method of claim 9, further comprising:
    modifying a particular minimum start time used to determine the particular input start time in accordance with a time window associated with processing to be performed by a particular intermediate computing node.

11. The computer-implemented method of claim 9, further comprising:
    during execution of the streaming job, generating further anchors that describe points in an output stream.

12. The computer-implemented method of claim 9, further comprising:
    during execution of the streaming job, determining, by a particular non-input computing node, whether a particular anchor describes a point in an output stream that is before, after, or equal to another anchor.

13. The computer-implemented method of claim 9, wherein the traversing is performed using a depth first search technique.

14. The computer-implemented method of claim 9, wherein the traversing is performed using a breadth first search technique.

15. The computer-implemented method of claim 9, wherein the trigger anchor includes the particular input start time for the particular input computing node.

16. The computer-implemented method of claim 9, further comprising:
    during execution of the streaming job, providing, by an intermediate computing node, the trigger anchor to the particular input computing node without waiting for an additional downstream request.

17. A computer storage medium storing computer-readable instructions that, when executed, cause a computing device to:

during compilation of a streaming job:
obtain a graph of computing nodes of the streaming job, the graph comprising one or more input computing nodes and one or more downstream computing nodes that are downstream of the one or more input computing nodes;
traverse the graph of computing nodes of the streaming job to determine one or more minimum start times of the one or more downstream computing nodes; and
assign one or more input times to each of the one or more input computing nodes in accordance with the one or more minimum start times of the one or more downstream computing nodes;

during execution of the streaming job:
receive, at a particular input computing node, a trigger anchor from a particular downstream computing node;
responsive to receipt of the trigger anchor by the particular input computing node, commence processing using a particular input start time assigned to the particular input computing node, the processing comprising:
generating an initial anchor;
receiving input data; and,
providing a batch of data in accordance with the received input data and the initial anchor.

18. The computer storage medium of claim 17, storing further computer-readable instructions that, when executed, cause the computing device to:
modify a particular minimum start time in accordance with a particular time window associated with processing to be performed by a particular intermediate computing node.

19. The computer storage medium of claim 17, wherein traversal is performed using a depth first search technique.

20. The computer storage medium of claim 17, wherein traversal is performed using a breadth first search technique.

* * * * *